Dec. 21, 1943.  R. W. CUMMINGS  2,337,085
MACHINE FOR SHAPING UPPERS OVER LASTS
Filed Sept. 28, 1940  6 Sheets-Sheet 2
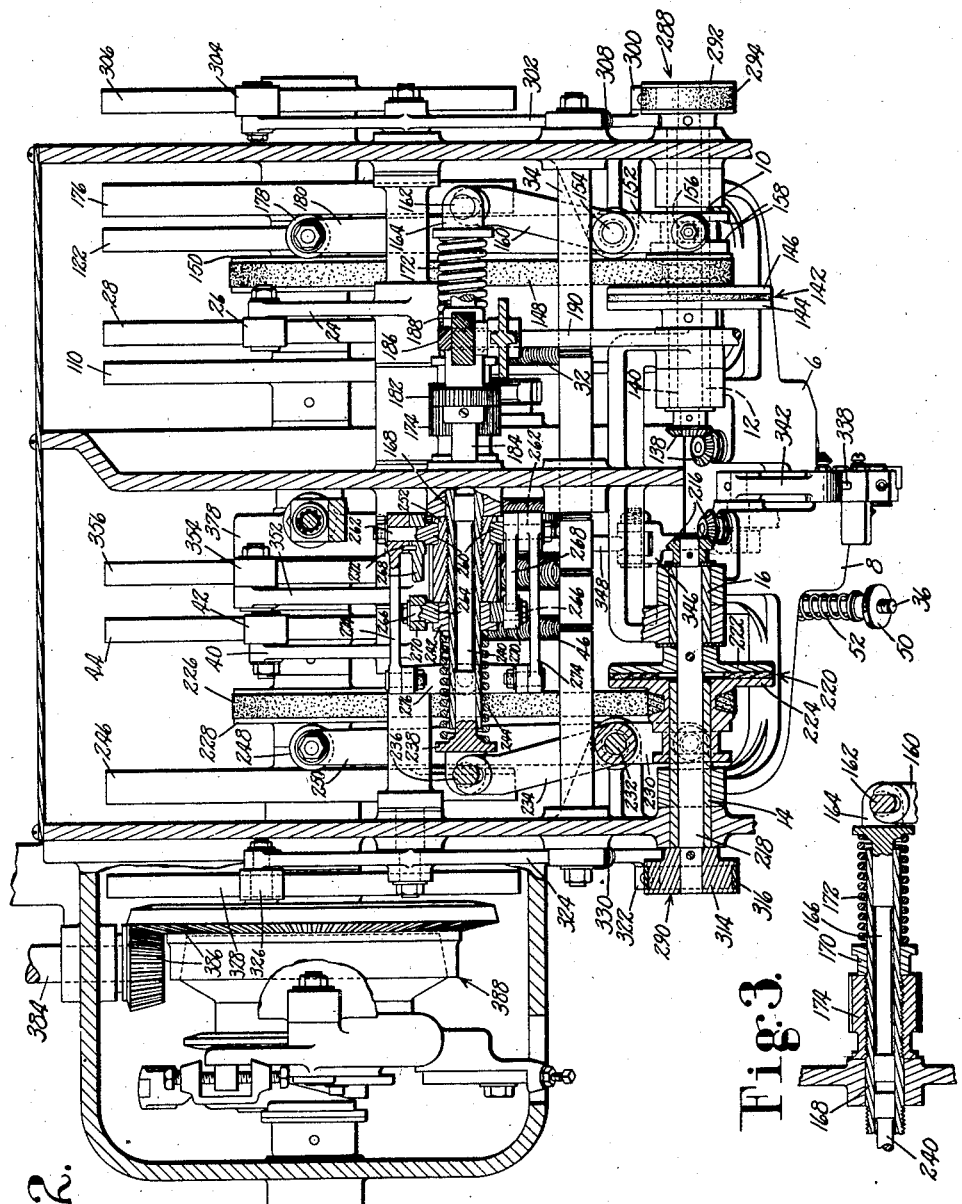
INVENTOR
Roy W. Cummings
By his attorney Dec. 21, 1943.  R. W. CUMMINGS  2,337,085
MACHINE FOR SHAPING UPPERS OVER LASTS
Filed Sept. 28, 1940   6 Sheets-Sheet 3

INVENTOR
Roy W. Cummings
By his attorney

Dec. 21, 1943.  R. W. CUMMINGS  2,337,085
MACHINE FOR SHAPING UPPERS OVER LASTS
Filed Sept. 28, 1940  6 Sheets-Sheet 4

INVENTOR
Roy W. Cummings
By his attorney

Dec. 21, 1943.    R. W. CUMMINGS    2,337,085
MACHINE FOR SHAPING UPPERS OVER LASTS
Filed Sept. 28, 1940    6 Sheets-Sheet 5
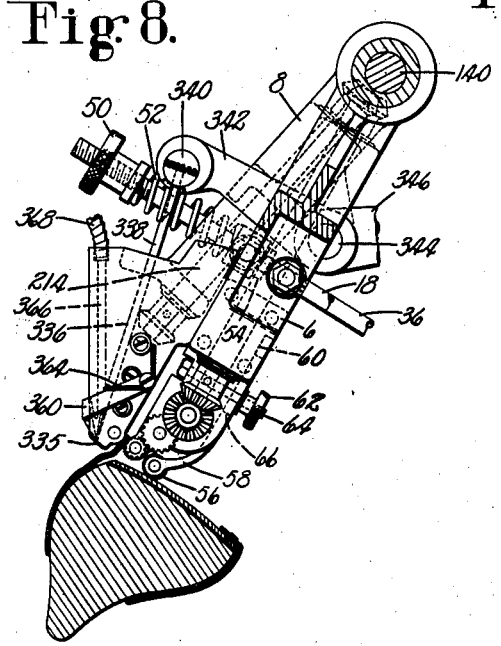
Fig. 8.
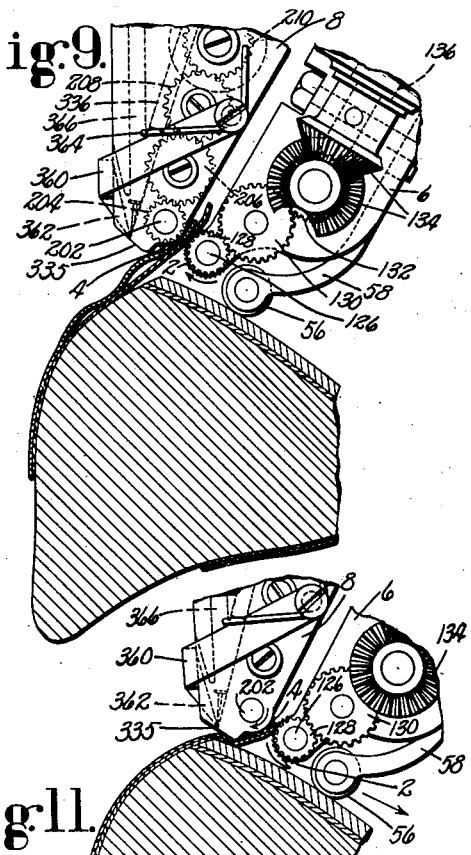
Fig. 9.
Fig. 11.
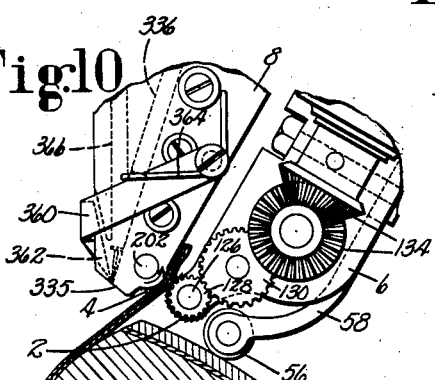
Fig. 10.
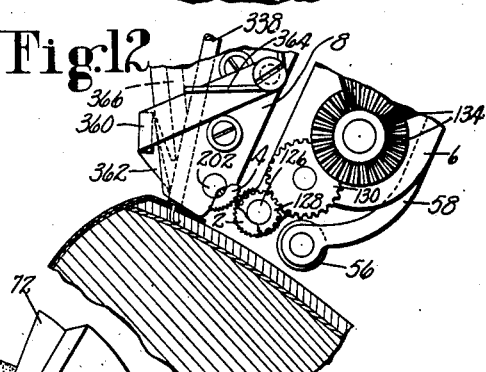
Fig. 12.
INVENTOR
Roy W. Cummings
By his attorney Patented Dec. 21, 1943

2,337,085

UNITED STATES PATENT OFFICE 2,337,085

MACHINE FOR SHAPING UPPERS OVER LASTS

Roy W. Cummings, Beverly, Mass., assignor to United Shoe Machinery Corporation, Flemington, N. J., a corporation of New Jersey Application September 28, 1940, Serial No. 358,851

85 Claims. (Cl. 12—2)

This invention relates to machines for shaping uppers over lasts, and is herein illustrated as embodied in a lasting machine in the use of which the upper is operated upon successively in different locations along each side of the shoe, the upper in each location being pulled over the last, wiped inwardly over an insole on the last and then fastened to the insole. It will be understood, however, that in various novel aspects the invention is not limited to machines which thus operate progressively to last shoes.

Among its objects, the invention has in view the provision of upper-pulling means whereby different layers of upper materials, such as an outer layer of leather and a lining, will be pulled with forces appropriate respectively to the characteristics of the different layers, so that the lining will be conformed tightly and smoothly to the contour of the last without excessive strain thereon and the outer layer will be subjected to all the force required to stretch and shape it properly without any danger of damaging the lining. To this and other ends, the machine herein shown is provided with members arranged to grip the margin of the upper between them by engagement respectively with the inner and the outer layer of the upper materials, and means for imparting to each of these members independently of the other upper-pulling movement limited by the resistance of the corresponding layer of the upper materials to the force of the pull applied thereto. Preferably, as illustrated, the upper-gripping members comprise rolls which engage the inner and the outer layer of the materials respectively with an unslipping grip and which are rotated about axes extending lengthwise of the margin of the upper to pull the different layers, the rolls being operated respectively through friction clutches each arranged to slip in response to resistance of the corresponding layer of the materials to the force of the pull applied thereto. The invention in its illustrated embodiment further provides clutch-controlling means adjustable prior to the operation of the machine to vary as desired the force of the pull applied to each layer of the materials, and additional means for controlling one of the clutches at the time of operation of the machine to increase at the will of the operator the force of the pull applied to the outer layer.

Novel features of the invention are to be recognized also in means for timing the operations of the upper-gripping members and in means for controlling them when they are not being operated. In the machine herein shown the above-mentioned clutches are controlled respectively by different cams which determine when the upper-gripping rolls are operated in a cycle of operations of the machine, the actual construction being such that operative movement is imparted first to the roll which acts on the lining, then to the roll which acts on the outer layer of the materials, and thereafter again to the roll which acts on the lining. Insurance is thus afforded that the lining will be pulled smoothly and tightly over the last before the outer layer is pulled and also that any slack which may develop in the lining during the pulling of the outer layer will be eliminated. Associated respectively with the different rolls are brakes which tend to prevent the rolls from turning when they are disconnected by their clutches from the source of power, each brake being applied and released automatically in time relation to the actuation of the corresponding clutch.

A further object of the invention is to insure that the upper will be held effectively against loss of tension until it is fastened to the insole. In the machine herein shown the upper-gripping rolls, after they have been rotated to pull the upper heightwise of the last as above described, are moved bodily to pull its margin inwardly over the insole, together with a wiper which wipes the margin of the upper inwardly into position to be fastened. As the rolls are thus moved inwardly over the insole they are reversely rotated by the pull of the upper thereon until the upper escapes from between them, by which time the wiper has arrived in position to hold the upper by pressing it against the insole. The resistance of the above-mentioned brakes to such reverse movements of the rolls insures that the upper will be held effectively under tension until the wiper has thus arrived in position to control it. The invention further provides means for adjusting the brakes to vary their effectiveness and thus to vary the force of the inward pull applied to the upper materials by the inward movement of the rolls over the insole. In the construction shown the upper is fastened by a tack which is driven by mechanism movable inwardly over the insole with the rolls and the wiper, but it will be understood that the invention is not limited to tacking means for fastening the upper.

As a further feature, the invention provides novel means for controlling the last and shoe in the upper-shaping operation. The machine shown is so constructed as to operate on the upper of a shoe in the hands of the operator at a side of the shoe which faces the operator, and for the purpose in view the machine is provided with a back rest which is moved forwardly into supporting engagement with the other side of the shoe after the shoe has been presented by the operator in position to be operated upon and is locked against reverse movement. The back rest thus assumes a position determined by the shoe and holds the shoe effectively against rearward movement as the upper is pulled and wiped inwardly over the insole.

The above and other features of the invention, including various novel details of construction and combinations of parts, will now be more particularly described with reference to the accompanying drawings and thereafter pointed out in the claims.

In the drawings,

Fig. 2 is mainly a plan view of the structure shown in Fig. 1, with parts in section;

Fig. 3 is a sectional view in a horizontal plane of a portion of the structure shown in Fig. 2;

Figure 13:
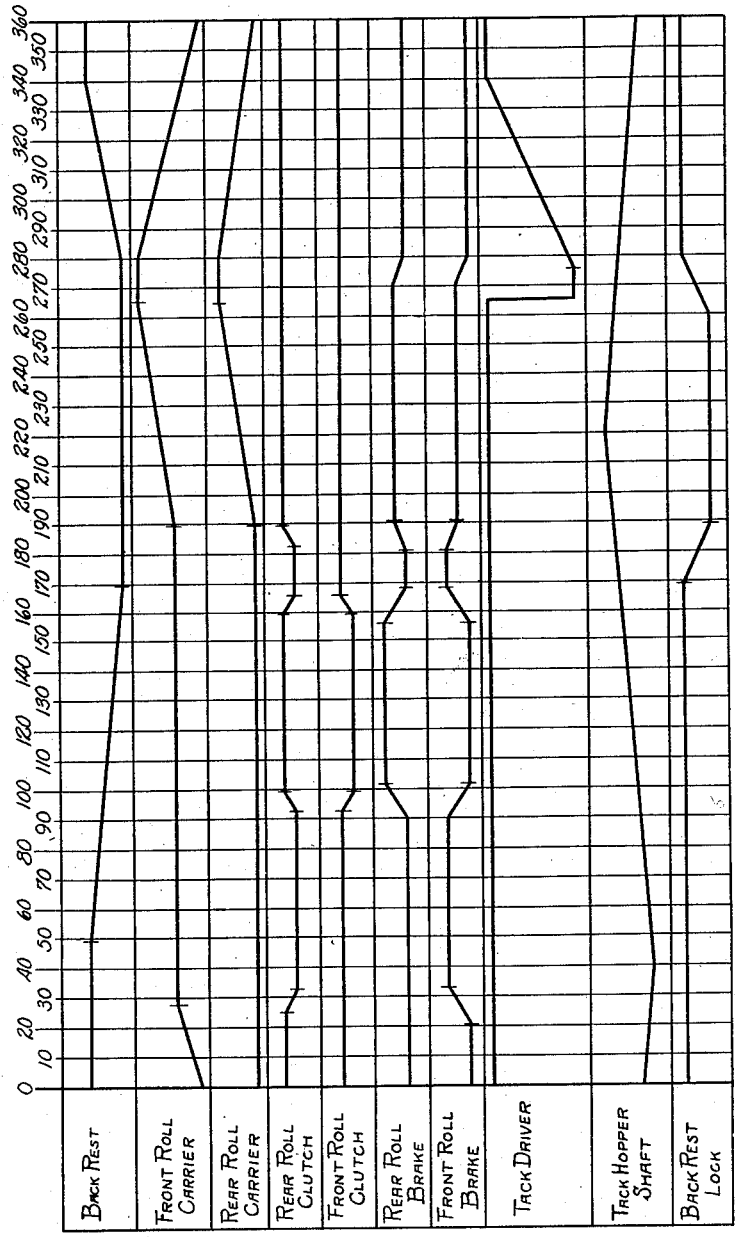

Figs. 8 to 12, inclusive, are views mainly in right-hand side elevation illustrating different successive positions of parts which operate on the shoe; and Fig. 13 is a cam chart illustrating the relative timing of the operations of different parts.

Figure 6:
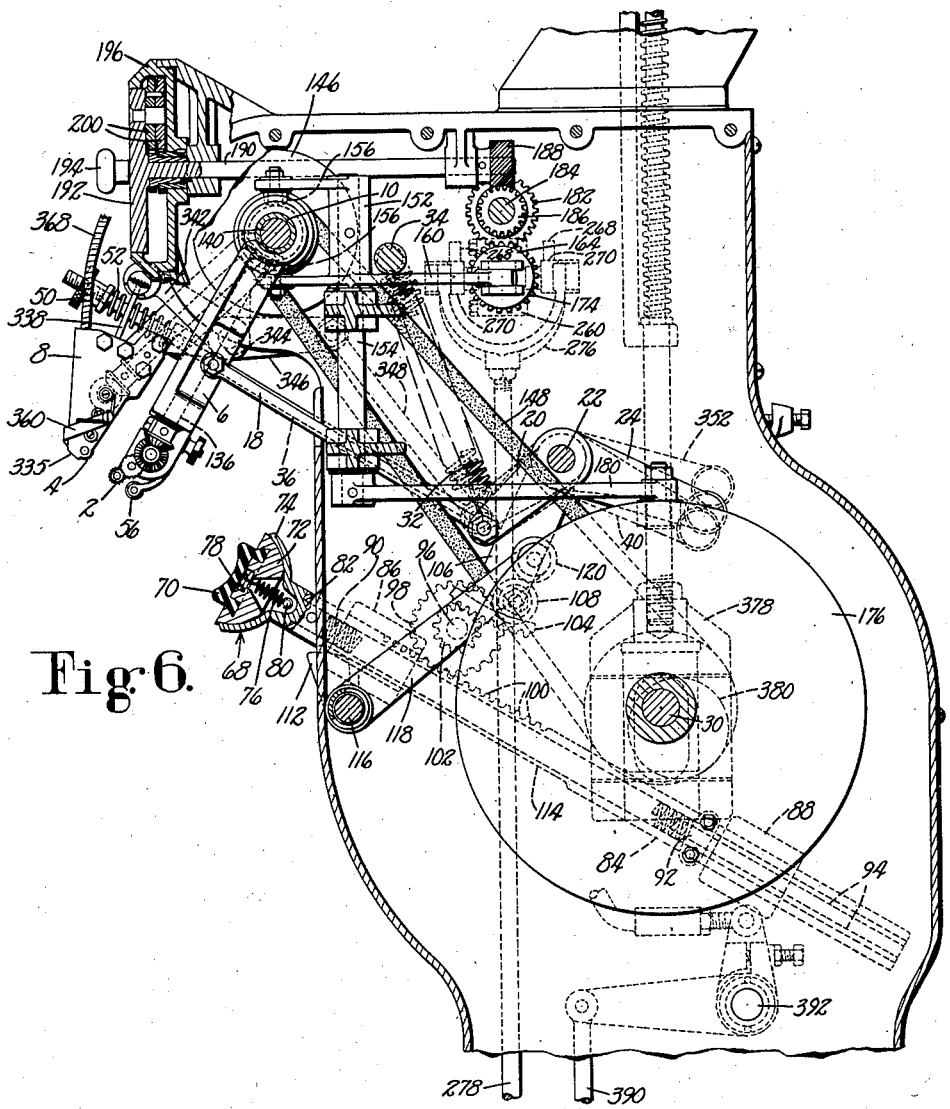
Fig. 6 is a view partly in right-hand side elevation and partly in section of portions of the structure shown in Fig. 1.

The machine is provided with two rolls 2 and 4 arranged to grip the margin of the upper between them and to pull the upper by engagement therewith as they are rotated, these rolls being arranged to engage respectively the inner and the outer layer of the upper materials. The rolls 2 and 4 are supported respectively on carriers 6 and 8 mounted to swing rearwardly and forwardly in directions widthwise of the shoe, the carrier 6 being thus movable about two bearing sleeves 10 and 12 (Fig. 2) fast in the frame of the machine, and the carrier 8 being movable about similar sleeves 14 and 16. The carrier 6 is connected by a link 18 to one arm 20 of a lever which is mounted to swing about a fixed shaft 22 (Fig. 6) and which has another arm 24 provided with a roll 26 (Fig. 2) engaged by a cam 28 fast on a cam shaft 30. A spring 32 connected to the arm 20 and to a rod 34 mounted on the frame holds the roll in engagement with the cam. The carrier 8 is connected through a rod 36 to one arm 38 (Fig. 1) of another lever which swings about the shaft 22, this lever having a second arm 40 provided with a roll 42 engaged by a cam 44 on the cam shaft 30. A spring 46 connected to the arm 38 and to the rod 34 holds the roll 42 in engagement with the cam 44. The rod 36 extends loosely through a lug 48 on the carrier 8 and has threaded thereon a nut 50 between which and the lug is a compression spring 52. A collar 54 (Fig. 8) fast on the rod 36 is arranged to engage the lug 48 on the opposite side thereof from the spring 52 to determine the initial position of the carrier 8. Initially, the two carriers 6 and 8 are in such relation to each other that the rolls 2 and 4 are separated to provide space to receive the margin of the upper between them, as shown in Fig. 6. After a shoe has been presented with the margin of the upper between the rolls, the carrier 8 is swung rearwardly by the cam 44 to cause the front roll 4 to grip the upper against the rear roll 2 and by further movement of the rod 36 the spring 52 is compressed more or less to apply gripping pressure yieldingly to the upper. The amount of initial compression of this spring may be varied by turning the nut 50 to vary the force with which the upper is gripped. After the upper has been pulled by rotation of the rolls 2 and 4 in the manner hereinafter described, the two carriers 6 and 8 are swung rearwardly as a unit by their cams to carry the rolls inwardly over the insole. Later in the cycle of operations the carriers are returned to their starting positions by the action of the springs 32 and 46, as permitted by the cams 28 and 44.

When the shoe is presented to the machine by the operator, its position heightwise is determined by a roll 56 which engages the insole and is freely rotatable on a bar 58 supported on the carrier 6. This bar is adjustable in directions heightwise of the shoe along a guideway 60 (Fig. 8) in the carrier and is held in adjusted position by a nut 62 which clamps it on its guideway, this nut being threaded on a bolt 64 which extends through the carrier 6 and through a slot 66 in the bar.

In order to support the shoe against rearward movement in the lasting operation, it is further controlled by a back rest 68 arranged to engage the shoe on the opposite side thereof from the operator. This back rest comprises a rubber shoe-engaging pad 70 (Fig. 6) mounted on a holder 72 which has a spherically curved face arranged to engage a similarly curved face formed in a cup-shaped member 74, the holder 72 and the pad being therefore universally movable relatively to the cup-shaped member. A spring 76 connected to a pin 78 engaging the holder 72 and to a pin 80 in the member 74 keeps the holder in place on its curved seat while permitting it to tip in any direction. The member 74 is provided with a stem 82 fast in the front end of a rearwardly and downwardly inclined tubular member 84 which is slidingly movable in bearings provided in lugs 86 and 88 on the frame of the machine. Mounted in the tubular member 84 is a compression spring 90 in engagement respectively at its front and rear ends with the stem 82 of the member 74 and with a finger 92 (Fig. 1) which is fast on the frame and extends through a slot 94 (Fig. 6) in the tubular member. It will thus be seen that the spring 90 tends to move the back rest 68 in a forward direction. Initially, however, the back rest is held in a retracted position, as illustrated in Fig. 6, to prevent it from interfering with the positioning of the shoe with the margin of the upper in proper relation to the upper-gripping rolls. For this purpose, there is fast on a shaft 96 (Fig. 6) rotatable in a bearing in the frame a gear 98 in engagement with rack teeth 100 formed on the tubular member 84. Also fast on the shaft 96 is a pinion 102 engaged by a gear sector 104 formed on an arm 106. This arm is mounted to swing about the shaft 22 and carries a roll 108 engaged by a cam 10 (Fig. 1) on the cam shaft 30. It will be evident that the spring 90, by its action on the tubular member 84, holds the roll 108 against the cam 110. As illustrated in Fig. 13, this cam is so formed that in the cycle of operations it permits the spring 90 to move the back rest 68 forwardly into engagement with the shoe to support the shoe thereafter against movement in a rearward direction. This forward movement of the back rest is a comparatively slow movement, and the spring 90 is a comparatively light spring, so that the back rest, upon its engagement with the shoe, has no objectionable tendency to displace the shoe in a forward direction. To insure that the back rest will hold the shoe effectively against rearward displacement when the upper-gripping rolls are moved rearwardly, there is further provided a locking member 112 (Figs. 1 and 6) arranged to extend through an opening in the lug 86 and having a curved surface arranged to engage a flat face 114 on the member 84 to lock this member frictionally against rearward movement. The member 112 is fast on a rockshaft 116 mounted in bearings in the frame, and also fast on this rockshaft is an arm 118 provided with a roll 120 engaged by a cam 122 on the cam shaft 30. A torsion spring 124 connected to this arm holds the roll in engagement with the cam and, when permitted by the cam, turns the rockshaft 116 to move the locking member 112 into operative engagement with the member 84.

As illustrated, the two upper-gripping rolls 2 and 4 are provided with teeth to prevent them from slipping on the different layers of the upper materials. The rear roll 2 is fast on a shaft 126 (Fig. 9) which is rotatable in the carrier 6 and has also fast thereon a pinion 128 connected by an idle gear 130 to a gear 132 which is driven through bevel gears 134 by a shaft 136 rotatable in bearings in the carrier. The shaft 136 is connected by bevel gears 138 (Fig. 2) to a shaft 140 which is rotatable in the previously mentioned sleeves 10 and 12. The shaft 140 is rotated through a friction clutch 142 which comprises a clutch member 144 fast on the shaft and a cooperating clutch member 146 rotatable on the sleeve 10. The member 146 is connected by a belt 148 to a pulley 150 fast on the cam shaft 30 and is accordingly rotated by the cam shaft throughout each cycle of operations of the machine. The clutch member 146 is also movable on the sleeve 10 lengthwise of the shaft 140 into and out of driving relation to the member 144. It is controlled by a yoke member 152 (Figs. 2 and 6) which is fast on a vertical rock shaft 154 mounted in bearings in the frame and carries rolls 156 lying in a groove 158 in the hub of the member 146. Extending rearwardly from the yoke member 152 is an arm 160 the rear end of which is forked to engage oppoiste sides of a pin 162 swiveled in the head 164 of a rod 166 (Fig. 3). This rod is slidingly mounted in a sleeve 168 fast in the frame of the machine. Between the head 164 and a collar 170 on the sleeve 168 is a compression spring 172. The collar is slidingly mounted on the sleeve and abuts at one end against a nut 174 which is threaded on the sleeve and is rotatable to vary the amount of compression of the spring 172. It will thus be seen that the spring 172 tends to move the clutch member 146 into driving relation to the member 144. The member 146 is further controlled by a cam 176 which is fast on the cam shaft 30 and one side of which is in engagement with a roll 178 carried by an arm 180 fast on the rockshaft 154. Accordingly, the spring 172 moves the clutch member 146 into driving relation to the member 144 only when permitted by the cam 176, and the cam determines the times in the cycle of operations when power is transmitted through the clutch to the upper-gripping roll 2.

Figure 1:
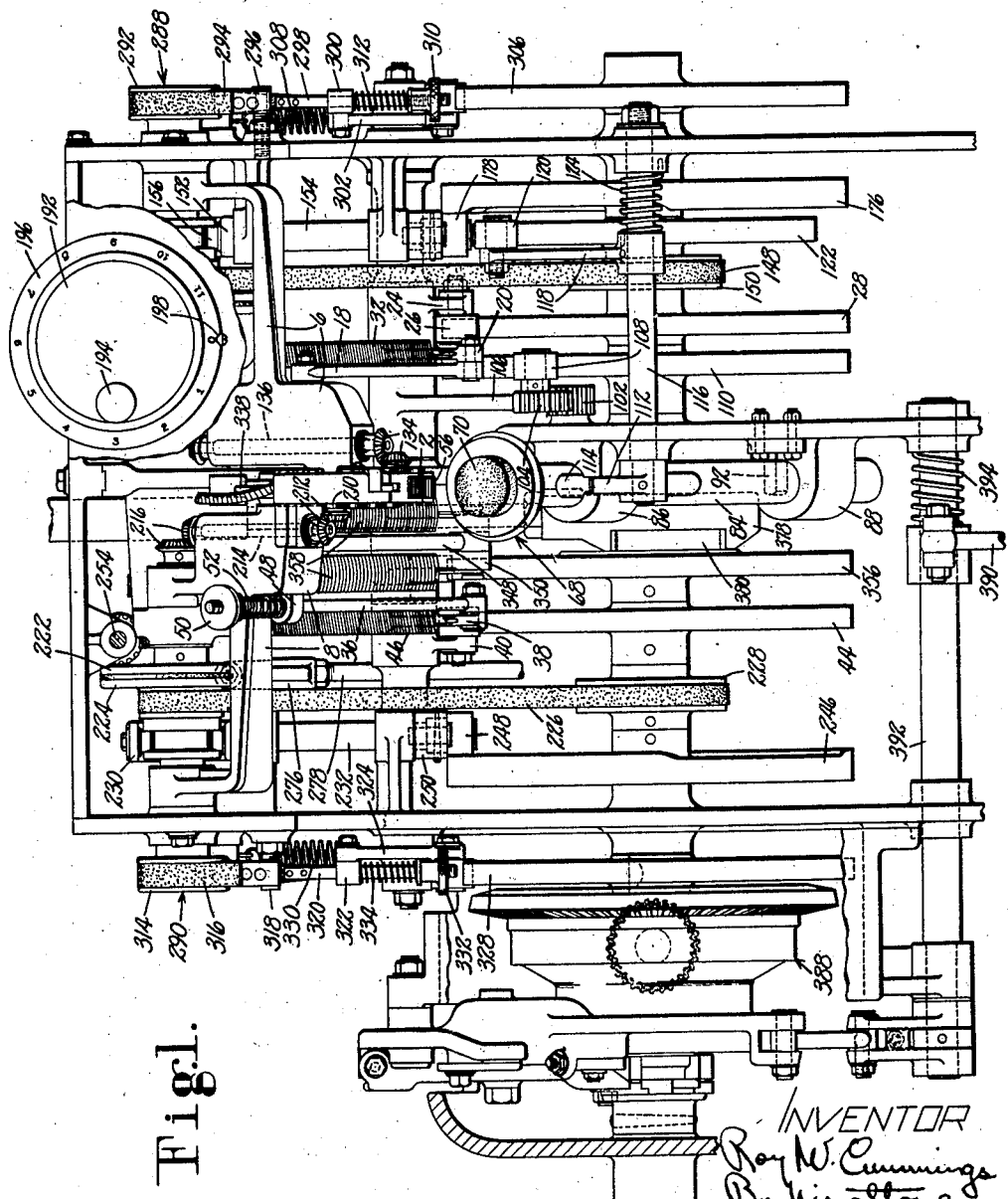
Fig. 1 is a view in front elevation of the main portion of a machine constructed in accordance with the present invention, with portions of the frame broken away.

For turning the nut 174 to vary the amount of compression of the spring 172 and thereby to vary the force with which the friction clutch member 146 is held in driving relation to the member 144, there is provided a gear 182 which is rotatable on a fixed shaft 184 and engages gear teeth formed on the nut. Integral with the gear 182 is a spiral gear 186 engaged by a similar gear 188 fast on a shaft 190 which is rotatable in bearings in the frame. On the front end of this shaft is a disk 192 provided with a handle 194 by which the shaft may be turned. To afford the operator an indication of the state of compression of the spring 172, there is rotatable about the shaft 190 a member 196 which, as illustrated in Fig. 1, is provided with a series of numbers arranged to register with a fixed pointer 198. The member 196 is turned at a slower rate than the shaft 190 by mechanism which includes planetary gearing 200 (Fig. 6) carried by the disk 192 and which need not be further described.

The provision of means for thus varying with precision the amount of compression of the spring 172 is particularly useful by reason of the fact that the amount of force with which the inner layer of the upper materials, i. e., the lining, is pulled by the roll 2 depends upon the force with which the clutch member 146 is pressed toward the member 144. That is, when the resistance of the lining to the force of the pull applied thereto becomes great enough, the clutch member 146 slips relatively to the member 144 without turning the roll 2.

Figure 7:
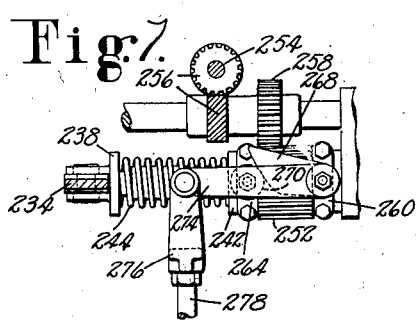
Fig. 7 is a detail view in front elevation of mechanism provided for increasing at the time of operation of the machine the force of the pull on the outer layer of the upper materials.

The front roll 4, which acts on the outer layer of the upper materials, is fast on a shaft 202 (Fig. 9) which is rotatable in the carrier 8 and has also fast thereon a pinion 204 connected by two idle gears 206 and 208 to a gear 210 which is driven through bevel gears 212 (Fig. 1) by a shaft 214 rotatable in bearings in the carrier 8. The shaft 214 is driven through bevel gears 216 (Fig. 2) by a shaft 218 rotatable in the previously mentioned sleeves 14 and 16. The shaft 218 is driven through a clutch 220 which is, like the previously mentioned clutch 142 and is controlled, for the most part, in the same manner as the clutch 142. That is, the clutch 220 comprises a member 222 fast on the shaft 218 and a member 224 which is movable on the sleeve 14 and is driven through a belt 226 by a pulley 228 on the cam shaft 30. The member 224 is controlled by a yoke member 230 which is similar to the previously mentioned yoke member 152 and is fast on a vertical rockshaft 232. Extending rearwardly from the yoke member 230 is an arm 234 connected to a pin 236 in the head 238 of a rod 240 slidingly movable in the previously mentioned sleeve 168. Between the head 238 and a collar 242 slidingly mounted on the sleeve 168 is a spring 244 which moves the clutch member 224 into driving relation to the member 222 when permitted by a cam 246 on the cam shaft 30, one side of this cam engaging a roll 248 carried by an arm 250 fast on the rockshaft 232. The collar 242 abuts against one end of a nut 252 which is threaded on the sleeve 168 and by its turning movement serves to vary the amount of compression of the spring 244 and therefore the amount of force with which the clutch member 224 is held in driving relation to the member 222. From the previous description of the means for operating the roll 2 it will be understood that the amount of upper-pulling force which the roll 4 applies to the outer layer of the upper materials depends upon the force of the spring 244, since the clutch member 224 slips relatively to the member 222 when the resistance of the outer layer of the upper to the force of the pull applied thereto by the roll 4 becomes great enough. The nut 252 is turned by mechanism of the same character as that provided for turning the nut 174, comprising a shaft 254 (Figs. 1 and 7) which corresponds to the previously mentioned shaft 190 and is connected by spiral gears 256 to a gear 258 in engagement with teeth on the nut.

Figure 5:
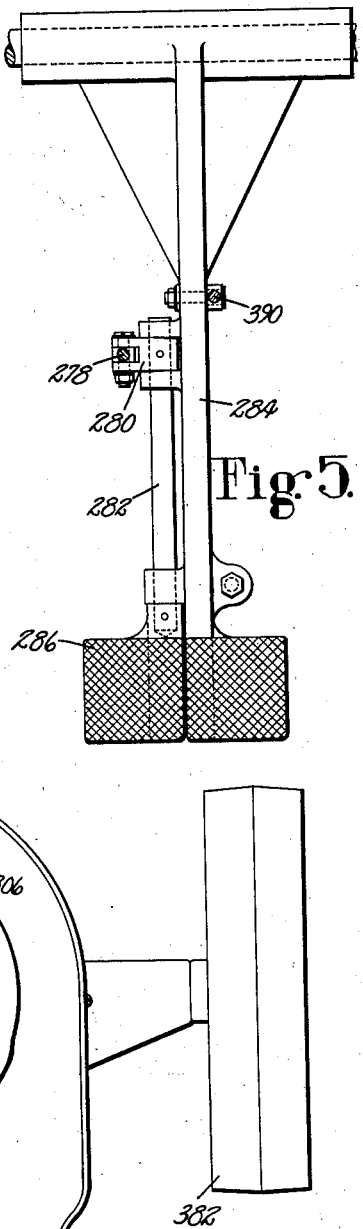
Fig. 5 is a plan view of treadles with which the machine is provided.

In lasting the sides of a shoe it may be desirable to pull the outer layer of the upper materials with greater force in some locations than in other locations. The machine herein shown is accordingly so constructed as to enable the operator to increase temporarily the amount of compression of the spring 244 in any particular cycle of operations of the machine. For this purpose there is mounted in an annular groove in the nut 252 a two-part clamp 260 (Figs. 2, 6 and 7) projecting from opposite sides of which are studs 262, and mounted in an annular groove in the collar 242 is a similar two-part clamp 264 projecting from the sides of which are studs 266. Mounted to swing about the studs 262 are cam members 268 having cam faces in engagement with rolls 270 on the studs 266. These cam members are connected by pins 272, one of which is shown in Fig. 2, to arms 274 which are also mounted to swing about the studs 262 and are pivotally connected to a yoke member 276 (Figs. 2 and 6). This yoke member is connected by a rod 278 to an arm 280 (Fig. 5) which is fast on a rockshaft 282 mounted in lugs formed on the side of a treadle 284 which is depressible as hereinafter described to start the power operation of the machine. Fast on the front end of the rockshaft 282 is a treadle member 286 which the operator may engage with the same foot by which he depresses the treadle 284. If the operator does not engage the member 286 with his foot when he depresses the starting treadle 284, the depression of this treadle has no effect on the spring 244, since the rockshaft 282 turns idly in its bearings because of the resistance of the spring to the movement of the collar 242. If, however, the operator engages the member 286 in such manner as to prevent turning of the rockshaft 282, the depression of the treadle 284 serves to move the rod 278 downwardly and thereby to force the collar 242 along the sleeve 168 and increase the compression of the spring 244. The operator may also further increase the compression of the spring by tipping the treadle member 286 in such manner as to turn the rockshaft 282. It will be understood that when the nut 252 is adjusted along the sleeve 168 to vary the compression of the spring 244, it turns relatively to the clamp 260 and moves this clamp and the parts connected thereto with it along the sleeve 168, so that the cams 268 are maintained in the same relation to the rolls 270.

The upper-pulling rolls 2 and 4 are further controlled respectively by brakes 288 and 290 which, at times in the cycle when the rolls are not under control of the clutches through which they are operated, prevent turning movements of the rolls or permit reverse turning movements thereof only in response to a substantial amount of force applied thereto by the pull of the upper thereon. The brake 288 comprises a grooved pulley 292 fast on the shaft 140 and a flexible band 294 extending part way around the pulley in frictional engagement therewith. The band is anchored at one end to a stud 296 threaded in the frame and is connected at its other end to a rod 298 which extends through a block 300 pivotally mounted on the front end of a lever 302. This lever is mounted to swing about the shaft 22 and is provided on its rear end with a roll 304 engaged by a cam 306 on the cam shaft 30. A spring 308 connected to the lever 302 tends to swing the front end of the lever upwardly and holds the roll 304 in engagement with the cam. Between the block 300 and a nut 310 threaded on the rod 298 is a spring 312 through which a pull is applied yieldingly to the brake band 294 by downward swinging movement of the front end of the lever 302. When the roll 2 is under control of the clutch 142 the position of the lever 302 is such that the brake 288 opposes no substantial resistance to the turning of the shaft 140, but when the clutch member 146 is moved out of driving relation to the member 144 the band 294 is tightened about the pulley 292 so as to prevent any turning movement of the roll 2 except in response to a substantial amount of force applied to the roll by the pull of the inner layer of the upper materials thereon. Adjustment of the nut 310 serves to vary the amount of force thus required to turn the roll reversely.

The roll 4 is controlled by its brake 290 in the same manner as the roll 2 is controlled by its brake 288. The brake 290 comprises a pulley 314 fast on the shaft 218 and a band 316 in frictional engagement with the pulley, the band being connected at one end to a fixed stud 318 and at its other end to a rod 320 extending through a block 322 pivotally mounted on the front end of a lever 324. The rear end of this lever carries a roll 326 in engagement with a cam 328 on the shaft 30. A spring 330 (Fig. 2) connected to the lever 324 holds the roll in engagement with the cam. Between the block 322 and a nut 332 threaded on the rod 320 is a spring 334 the amount of compression of which may be varied by turning the nut. Since these parts for controlling the brake band 316 operate in the same manner as the parts above described for controlling the brake band 294, no further description of their operation is necessary.

Figure 4:
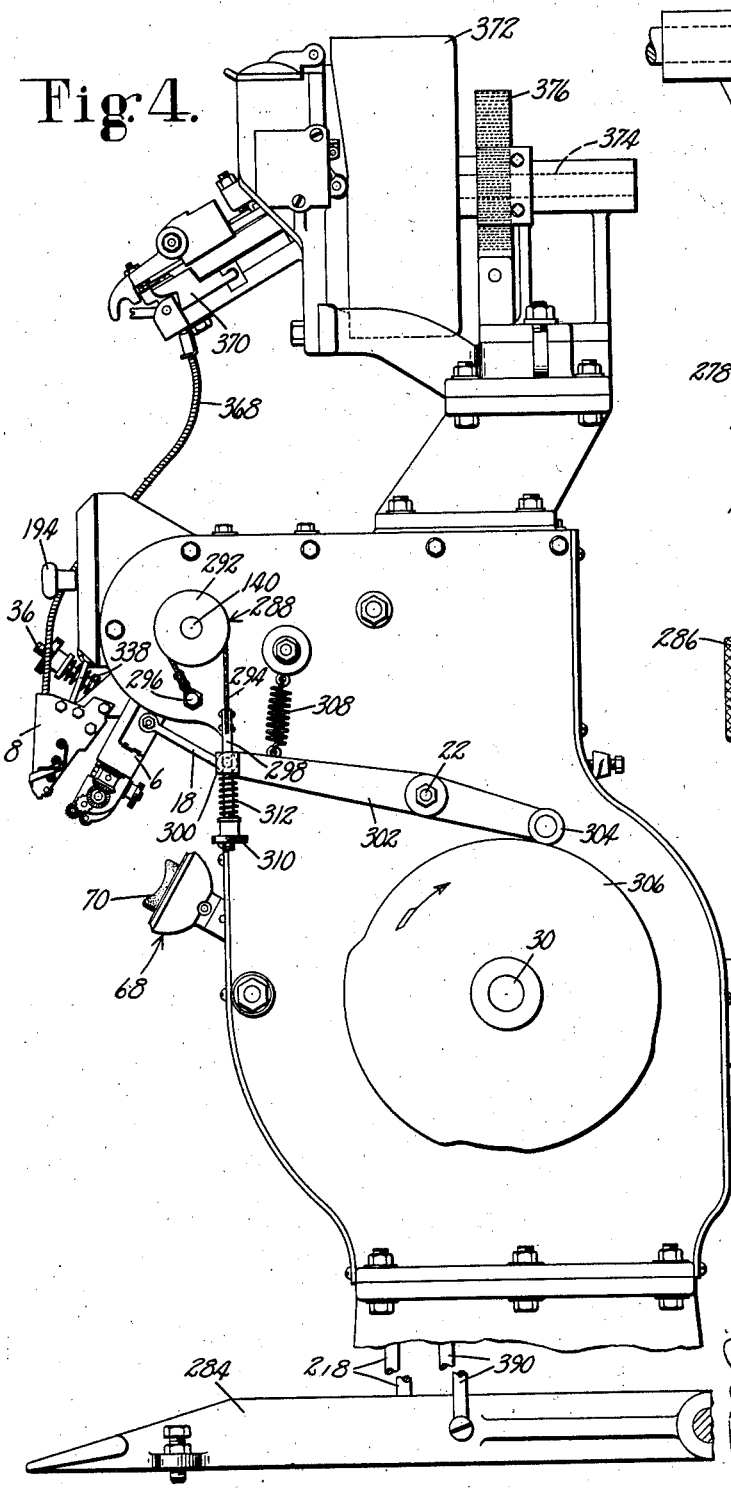
Fig. 4 shows the machine in right-hand side elevation, with parts broken away.

Reference has been made to the fact that after the upper has been pulled by rotation of the rolls 2 and 4 the roll carriers 6 and 8 are swung rearwardly to carry the rolls inwardly over the insole. At this time the rolls are under control of the brakes 288 and 290, so that while they are rotated reversely by the pull of the upper thereon they still maintain the upper under tension. Before the carriers 6 and 8 have been swung rearwardly far enough to cause the margin of the upper to leave the rolls, the upper is pressed against the insole by the lower end 335 of the carrier 8 (Fig. 11) which is so formed as to act as a wiper on the upper during further movement of the carriers. While the upper may be fastened to the insole in various ways, the machine herein shown is provided with means for driving tacks for this purpose, the tacks being clinched on a metal plate on the last. Formed in the carrier 8 is a driver passage 336 (Fig. 8) in which operates a tack driver 338. At its upper end this driver is fast in a pin 340 which is swiveled in the front end of one arm 342 of a lever pivoted at 344 on the carrier 8. This lever has also a rearwardly extending arm 346 (Figs. 2 and 6) connected by a link 348 to an arm 350 (Fig. 1) of a lever which is mounted to swing on the shaft 22, this lever having also a rearwardly extending arm 352 (Figs. 2 and 6) provided with a roll 354 in engagement with a cam 356 on the shaft 30. A pair of springs 358 connected to the rod 34 and to the arm 350 serve to impart tack-driving movement to the driver 338 when permitted by the cam 356. As suggested in Fig. 13, this cam has an abrupt declivity to permit a quick movement of the tack driver. The tack is held in the driver passage 336 ready for the action of the driver by a tack-retaining member 360 which is pivotally mounted on the carrier 8 and has a finger 362 arranged to extend into the driver passage through a slot in the carrier. The member 360 is controlled by a spring 364 against the resistance of which it is movable to permit the passage of the tack. The tack is fed into the driver passage 336 at the proper time in each cycle through a passage 366 in the carrier 8. Tacks may be delivered to the passage 366 by any suitable known means, the machine herein shown being provided for this purpose with tack-separating and delivering mechanism of the same general character as disclosed in United States Letters Patent No. 1,002,422, granted on September 5, 1911 on an application of R. F. McFeely, but provided with a single raceway for the tacks instead of a plurality of raceways. From this mechanism tacks are conducted to the passage 366 through a flexible tube 368. It will be understood that mechanism of this well-known type includes a separator-operating slide 370 (Fig. 4), a tack hopper 372 and a rockshaft 374 by oscillatory movements of which the slide and the hopper are operated. The shaft 374 is operated by a vertically movable rack bar 376 yieldingly connected by well-known means to a yoke member 378 (Figs. 1 and 6) which in the machine herein shown is moved upwardly and downwardly by an eccentric 380 fast on the cam shaft 30.

The machine herein shown is operated by a belt-driven pulley 382 (Fig. 4) fast on a shaft 384 (Fig. 2) which is connected by bevel gears 386 to a one-revolution clutch 388. This clutch and the mechanism for controlling it need not be described in detail, since the construction is substantially as disclosed in Letters Patent No. 1,796,451, granted on March 17, 1931 on an application of George Goddu. Furthermore, any other suitable well-known clutch and controlling mechanism may, if desired, be used instead. It will be understood that the clutch is actuated to start the power operation of the machine by depression of the previously mentioned treadle 284 which, through a link 390, turns a rockshaft 392 against the resistance of a return spring 394, this rockshaft controlling the clutch in a manner which will be readily understood from the disclosure of the above-mentioned Letters Patent.

In the use of the machine the operator presents a shoe with its insole in engagement with the shoe rest roll 56 and with the margin of the upper materials at the side of the shoe which is toward him between the two rolls 2 and 4 which are initially spaced from each other as illustrated in Fig. 6. He then starts the power operation of the machine by depressing the treadle 284. At the beginning of the cycle, as indicated in Fig. 13, the front roll carrier 8 is swung rearwardly to cause its roll 4 to grip the margin of the upper materials against the roll 2, as shown in Fig. 8, the spring 52 being more or less compressed. Immediately thereafter the clutch 142 is actuated to cause the rear roll 2 to be rotated in the direction to pull the lining engaged thereby, as illustrated in Fig. 9. At the same time the brake 290 controlling the front roll 4 is rendered effective to prevent any rotation of this roll while the roll 2 is pulling the lining. Insurance is thus afforded that the lining will be pulled tightly and smoothly over the last before any pulling of the outer layer of the upper materials. It will be understood that when the resistance of the lining to the force of the pull applied thereto becomes great enough the clutch 142 slips. After such pulling of the lining the clutch 142 releases the roll 2, and simultaneously the brake 288 controlling this roll is rendered effective to prevent any reverse rotation thereof. At this time also the brake 290 controlling the front roll 4 is released and the clutch 220 is actuated to cause this roll to be rotated in the direction to pull the outer layer of the upper materials, as illustrated in Fig. 10, the rear roll 2 being held stationary. After this pull on the outer layer the front roll 4 is released by its clutch and the brake 290 is again rendered effective to hold this roll from turning. At substantially the same time the clutch 142 is again actuated to cause the roll 2 to be turned a second time in the direction to pull the lining, the brake 288 being simultaneously released. This insures that any slack in the lining which may have developed during the pulling of the outer layer of the upper materials will be eliminated. The lining having thus been pulled a second time, the roll 2 is released by the clutch 142 and the brake 288 is once more rendered effective. The shape of the cam controlling the brake 288, however, is such that the brake is applied at this time with less force than before, and the cam controlling the brake 290 acts simultaneously to lessen somewhat the force with which that brake controls the roll 4. Accordingly, both rolls are permitted to turn reversely in response to pull of the upper materials thereon, without too much strain on the upper materials, as the rolls are next moved bodily to pull the margin of the upper inwardly over the insole. This operation is effected by the swinging of both the roll carriers 6 and 8 as a unit in a rearward direction, beginning at 190° of the cycle. Prior to such rearward swinging movement of the carriers the back rest 68 is moved forwardly into shoe-engaging position and is locked in that position. As the carriers 6 and 8 are swung rearwardly the wiper 335 at the lower end of the carrier 8 arrives in position to press the margin of the upper materials on the insole while the upper is still held under tension by the rolls, as illustrated in Fig. 11. Thereafter the margin of the upper leaves the rolls and is wiped down on the insole by further movement of the wiper. In this operation the shoe may be depressed somewhat below the shoe rest roll 56. At the end of the rearward swinging movement of the carriers the tack driver 338 is operated to drive the tack, as illustrated in Fig. 12. Thereafter the parts of the machine are returned to their starting positions and another tack is fed into the driver passage 336. The operator then moves the shoe along and presents it in position for another portion of the upper materials to be lasted by the next cycle of operations of the machine.

As hereinbefore explained, if the operator regards it as desirable, in the lasting of any particular portion of the upper materials, that the outer layer of the materials be pulled with greater force than that for which the spring 244 is adjusted, he may control the treadle member 286 in such manner as to effect a further compression of this spring when he depresses the starting treadle 284. It will be understood that the starting treadle may be held depressed until near the end of the cycle, and, accordingly, the operator may maintain the spring 244 under the increased compression until after the pulling of the upper has been completed.

Having described the invention, what I claim as new and desire to secure by Letters Patent of the United States is:

1. In a machine for shaping uppers over lasts, members arranged to grip the margin of an upper between them, said members being movable respectively about different axes extending generally lengthwise of the margin of the upper and between which axes said margin is positioned to pull the upper.

2. In a machine for shaping uppers over lasts, rolls arranged to grip the margin of an upper between them, said rolls being rotatable about axes extending generally lengthwise of the margin of the upper to pull the upper, and means for rotating said rolls thus to pull the upper.

3. In a machine for shaping uppers over lasts, members arranged to grip the margin of an upper between them by engagement respectively with the inner and the outer layer of the upper materials, said members being movable respectively about different axes extending generally lengthwise of the margin of the upper to pull the upper, and means for thus moving said members each independently of the other.

4. In a machine for shaping uppers over lasts, rolls arranged to grip the margin of an upper between them by engagement respectively with the inner and the outer layer of the upper materials, said rolls being rotatable about axes extending generally lengthwise of the margin of the upper to pull the upper, a power-driven operating member, and mechanisms operatively independent of each other for rotating said rolls respectively by the movement of said operating member.

5. In a machine for shaping uppers over lasts, members arranged to grip the margin of an upper between them by engagement respectively with the inner and the outer layer of the upper materials, and means for imparting to each of said members independently of the other upper-pulling movement limited by the resistance of the corresponding layer of the upper materials to the force of the pull applied thereto.

6. In a machine for shaping uppers over lasts, rolls arranged to grip the margin of an upper between them by engagement respectively with the inner and the outer layer of the upper materials, said rolls being rotatable to pull the upper, and means for imparting to each roll independently of the other rotary upper-pulling movement limited by the resistance of the corresponding layer of the upper materials to the force of the pull applied thereto.

7. In a machine for shaping uppers over lasts, members arranged to grip the margin of an upper between them by engagement respectively with the inner and the outer layer of the upper materials, and means comprising friction clutches associated respectively with said different members for operating them to pull the upper, each of said clutches being arranged to slip in response to resistance of the corresponding layer of the upper materials to the force of the pull applied thereto.

8. In a machine for shaping uppers over lasts, rolls arranged to grip the margin of an upper between them, said rolls being rotatable to pull the upper, and friction clutch means for rotating the rolls, said means being arranged to slip in response to resistance of the upper to the force of the pull applied thereto by the rolls.

9. In a machine for shaping uppers over lasts, rolls arranged to grip the margin of an upper between them by engagement respectively with the inner and the outer layer of the upper materials, said rolls being rotatable to pull the upper, and means comprising friction clutches associated respectively with said different rolls for rotating them to pull the upper, each of said clutches being arranged to slip in response to resistance of the corresponding layer of the upper materials to the force of the pull applied thereto.

10. In a machine for shaping uppers over lasts, members arranged to grip the margin of an upper between them by engagement respectively with the inner and the outer layer of the upper materials, means for operating said members to pull the upper, and means for varying with respect to each of said members independently of the other the force of the pull applied to the corresponding layer of the upper materials.

11. In a machine for shaping uppers over lasts, members arranged to grip the margin of an upper between them by engagement respectively with the inner and the outer layer of the upper materials, and mechanisms associated respectively with said different members for operating them to pull the upper, each of said mechanisms being adjustable independently of the other to vary the force of the pull applied to the corresponding layer of the upper materials.

12. In a machine for shaping uppers over lasts, members arranged to grip the margin of an upper between them by engagement respectively with the inner and the outer layer of the upper materials, means comprising friction clutches associated respectively with said different members for operating them to pull the upper, each of said clutches being arranged to slip in response to resistance of the corresponding layer of the upper materials to the force of the pull applied thereto, and means for varying with respect to said clutches independently of the other the force required to cause it thus to slip.

13. In a machine for shaping uppers over lasts, rolls arranged to grip the margin of an upper between them by engagement respectively with the inner and the outer layer of the upper materials, said rolls being rotatable to pull the upper, means comprising friction clutches associated respectively with said different rolls for rotating them to pull the upper, each of said clutches being arranged to slip in response to resistance of the corresponding layer of the upper materials to the force of the pull applied thereto, springs associated respectively with said different clutches for rendering them frictionally effective, and means for adjusting each spring to vary with respect to the corresponding clutch the amount of force required to cause it thus to slip.

14. In a machine for shaping uppers over lasts, members arranged to grip the margin of an upper between them by engagement respectively with the inner and the outer layer of the upper materials, means for operating said members to pull the upper, means adjustable prior to the operation of the machine to vary the force of the pull applied to the upper by said members, and additional means arranged for optional use at the time of operation of the machine further to vary the force of the pull applied by one of said members only.

15. In a machine for shaping uppers over lasts, members arranged to grip the margin of an upper between them by engagement respectively with the inner and the outer layer of the upper materials, means for operating said members to pull the upper, means adjustable prior to the operation of the machine to vary with respect to each of said members independently of the other the force of the pull applied to the corresponding layer of the upper materials, and additional means arranged for optional use at the time of operation of the machine to increase the force of the pull applied to the outer layer only of the upper materials.

16. In a machine for shaping uppers over lasts, members arranged to grip the margin of an upper between them by engagement respectively with the inner and the outer layer of the upper materials, means comprising friction clutches associated respectively with said different members for operating them to pull the upper, each of said clutches being arranged to slip in response to resistance of the corresponding layer of the upper materials to the force of the pull applied thereto, means adjustable prior to the operation of the machine to vary with respect to each of said clutches the force required to cause it thus to slip, and additional means arranged for optional use at the time of operation of the machine to increase with respect to one of said clutches only the force required to cause it to slip.

17. In a machine for shaping uppers over lasts, rolls arranged to grip the margin of an upper between them by engagement respectively with the inner and the outer layer of the upper materials, said rolls being rotatable to pull the upper, means comprising friction clutches associated respectively with said different rolls for rotating them to pull the upper, each of said clutches being arranged to slip in response to resistance of the corresponding layer of the upper materials to the force of the pull applied thereto, springs associated respectively with said different clutches for rendering them frictionally effective, means for adjusting said springs prior to the operation of the machine to vary with respect to each clutch independently of the other the amount of force required to cause it thus to slip, and additional means arranged for optional use at the time of operation of the machine for further adjusting the spring associated with one of said clutches only to increase the force required to cause that clutch to slip.

18. In a power-operated machine for shaping uppers over lasts, members arranged to grip the margin of an upper between them by engagement respectively with the inner and the outer layer of the upper materials, means for operating said members to pull the upper, means adjustable prior to the operation of the machine to vary with respect to each of said members independently of the other the force of the pull applied to the corresponding layer of the upper materials, a treadle movable to start the power operation of the machine, and additional means arranged for optional use by movement of said treadle to vary the force of the pull applied by one of said members only.

19. In a power-operated machine for shaping uppers over lasts, rolls arranged to grip the margin of an upper between them by engagement respectively with the inner and the outer layer of the upper materials, said rolls being rotatable to pull the upper, means comprising friction clutches associated respectively with said different rolls for rotating them to pull the upper, each of said clutches being arranged to slip in response to resistance of the corresponding layer of the upper materials to the force of the pull applied thereto, springs associated respectively with said different clutches for rendering them frictionally effective, means for adjusting said springs prior to the operation of the machine to vary with respect to each clutch independently of the other the amount of force required to cause it thus to slip, a treadle movable to start the power operation of the machine, and additional means optionally movable by said treadle for adjusting the spring associated with one of said clutches only to increase the amount of force required to cause that clutch to slip.

20. In a machine for shaping uppers over lasts, members arranged to grip the margin of an upper between them by engagement respectively with the inner and the outer layer of the upper materials, a power-driven operating member for imparting upper-pulling movements to said upper-gripping members, and means for connecting each of said upper-gripping members independently of the other to said operating member and for disconnecting it therefrom in the course of the operation of the machine.

21. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, and automatic means for connecting the rolls to said operating member and for disconnecting them therefrom in the course of the operation of the machine.

22. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, and mechanisms associated respectively with said different rolls for connecting them each independently of the other to said operating member and for disconnecting them therefrom in the course of the operation of the machine.

23. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, clutches through which power is transmitted respectively to said different rolls from said operating member, and automatic means for actuating said clutches to start and stop the movements of the rolls in the course of the operation of the machine.

24. In a machine for shaping uppers over lasts, rolls arranged to grip the margin of an upper between them by engagement respectively with the inner and the outer layer of the upper materials, said rolls being rotatable to pull the upper, a power-driven shaft, means for rotating said shaft and for bringing it to a stop at the end of a cycle of operations of the machine, clutches through which power is transmitted respectively to said different rolls from said shaft, and means controlled by said shaft for actuating said clutches to start and stop the movements of the rolls at predetermined times in the cycle.

25. In a machine for shaping uppers over lasts, members arranged to grip the margin of an upper between them by engagement respectively with the inner and the outer layer of the upper materials, and means for operating said members respectively at different times to pull the different layers of the upper materials.

26. In a machine for shaping uppers over lasts, members arranged to grip the margin of an upper between them by engagement respectively with the inner and the outer layer of the upper materials, and means for operating said members first to pull the inner layer of the upper materials and thereafter to pull the outer layer.

27. In a machine for shaping uppers over lasts, members arranged to grip the margin of an upper between them by engagement respectively with the inner and the outer layer of the upper materials, and automatic means for moving said members relatively to each other first to pull the inner layer of the upper materials, then to pull the outer layer, and thereafter again to pull the inner layer.

28. In a machine for shaping uppers over lasts, members arranged to grip the margin of an upper between them by engagement respectively with the inner and the outer layer of the upper materials, and mechanisms associated respectively with said different members and movable in automatically determined time relation to each other to cause said members to pull the upper, the mechanism associated with the member for engaging the inner layer of the upper materials being movable to apply a pull to that layer before any pull is applied to the outer layer.

29. In a machine for shaping uppers over lasts, rolls arranged to grip the margin of an upper between them by engagement respectively with the inner and the outer layer of the upper materials, said rolls being rotatable to pull the upper, and means for rotating the rolls in sequence to pull the different layers of the materials respectively at different times.

30. In a machine for shaping uppers over lasts, rolls arranged to grip the margin of an upper between them by engagement respectively with the inner and the outer layer of the upper materials, said rolls being rotatable to pull the upper, and automatic means for first rotating only the roll engaging the inner layer of the upper materials and for then rotating the roll engaging the outer layer.

31. In a machine for shaping uppers over lasts, rolls arranged to grip the margin of an upper between them by engagement respectively with the inner and the outer layer of the upper materials, said rolls being rotatable to pull the upper, and automatic means for first rotating only the roll engaging the inner layer of the upper materials, then only the roll engaging the outer layer, and thereafter again only the roll engaging the inner layer.

32. In a machine for shaping uppers over lasts, members arranged to grip the margin of an upper between them by engagement respectively with the inner and the outer layer of the upper materials, a power-driven operating member for imparting upper-pulling movements to said upper-gripping members, and automatic means for connecting the upper-gripping members to said operating member in sequence to cause the different layers of the upper materials to be pulled respectively at different times.

33. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, and automatic means for connecting to said operating member first the roll engaging the inner layer of the upper materials and then the roll engaging the outer layer.

34. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, clutches through which power is transmitted respectively to the different rolls from said operating member, and automatic means for actuating said clutches respectively at different times to cause said rolls to operate in sequence.

35. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, clutches through which power is transmitted respectively to said different rolls from said operating member, and automatic means for actuating said clutches respectively at different times to cause rotation first only of the roll engaging the inner layer of the upper materials, then only of the roll engaging the outer layer, and thereafter again only of the roll engaging the inner layer.

36. In a machine for shaping uppers over lasts, members arranged to grip the margin of an upper between them by engagement respectively with the inner and the outer layer of the upper materials, a power-driven operating member for imparting upper-pulling movements to said upper-gripping members, and automatic means for connecting the upper-gripping members to said operating member in sequence and for disconnecting each upper-gripping member from said operating member when the other upper-gripping member is connected thereto.

37. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, clutches through which power is transmitted respectively to said different rolls from said operating member, and automatic means for actuating said clutches to connect the different rolls respectively to said operating member at different times and to disconnect each roll from the operating member when the other roll is connected thereto.

38. In a machine for shaping uppers over lasts, members arranged to grip the margin of an upper between them by engagement respectively with the inner and the outer layer of the upper materials, power-operated means for imparting upper-pulling movements to said upper-gripping members each independently of the other and for releasing each member after such movement thereof, and devices associated respectively with the different upper-gripping members and arranged to oppose reverse movements of said members when they are thus released.

39. In a machine for shaping uppers over lasts, members arranged to grip the margin of an upper between them by engagement respectively with the inner and the outer layer of the upper materials, a power-driven operating member for imparting upper-pulling movements to said upper-gripping members, means for connecting each of said upper-gripping members independently of the other to said operating member and for disconnecting it therefrom in the course of the operation of the machine, and devices associated respectively with the different upper-gripping members and arranged to oppose reverse movements of said members when they are disconnected from said operating member.

40. In a machine for shaping uppers over lasts, members arranged to grip the margin of an upper between them by engagement respectively with the inner and the outer layer of the upper materials, a power-driven operating member for imparting upper-pulling movements to said upper-gripping members, mechanisms associated respectively with said different upper-gripping members for connecting them each independently of the other to said operating member and for disconnecting them therefrom in the course of the operation of the machine, brakes associated respectively with said different mechanisms and arranged to oppose reverse movements of the corresponding upper-gripping members when they are disconnected from said operating member, and means for applying and releasing said brakes.

41. In a machine for shaping uppers over lasts, rolls arranged to grip the margin of an upper between them, said rolls being rotatable to pull the upper, a power-driven operating member for rotating said rolls, means for connecting the rolls to said operating member and for disconnecting them therefrom, and means arranged to oppose reverse movements of said rolls when they are disconnected from said operating member.

42. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, mechanisms associated respectively with said different rolls for connecting them to said operating member and for disconnecting them therefrom in the course of the operation of the machine, and brakes associated respectively with said different mechanisms and arranged to oppose reverse movements of the rolls when they are disconnected from said operating member.

43. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, automatic means for connecting the rolls to said operating member and for disconnecting them therefrom in the course of the operation of the machine, brakes associated respectively with the different rolls and arranged to oppose reverse movements thereof when they are disconnected from said operating member, and automatic means for applying and releasing said brakes.

44. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, clutches through which power is transmitted respectively to said different rolls from said operating member, automatic means for actuating said clutches to start and stop the movements of the rolls in the course of the operation of the machine, brakes associated respectively with the different rolls and arranged to oppose reverse movements thereof when they are disconnected from the operating member by said clutches, and automatic means for applying and releasing said brakes in time relation to the actuation of the clutches.

45. In a machine for shaping uppers over lasts, members arranged to grip the margin of an upper between them by engagement respectively with the inner and the outer layer of the upper materials, means for operating said members respectively at different times to pull the different layers of the upper materials and for releasing each member after it has thus been operated, and devices associated respectively with said different members and arranged to oppose reverse movements thereof when they are thus released.

46. In a machine for shaping uppers over lasts, members arranged to grip the margin of an upper between them by engagement respectively with the inner and the outer layer of the upper materials, means for operating said members respectively at different times to pull the different layers of the upper materials and for releasing each member after it has thus been operated, brakes associated respectively with the different upper-gripping members and arranged to oppose reverse movements of said members when they are thus released, and automatic means for applying said brakes respectively at different times.

47. In a machine for shaping uppers over lasts, members arranged to grip the margin of an upper between them by engagement respectively with the inner and outer layer of the upper materials, a power-driven operating member for imparting upper-pulling movements to said upper-gripping members, automatic means for connecting the upper-gripping members to said operating member in sequence and for disconnecting each upper-gripping member from said operating member when the other upper-gripping member is connected thereto, brakes associated respectively with the different upper-gripping members and arranged to oppose reverse movements thereof when they are disconnected from the operating member, and automatic means for applying and releasing said brakes in timed relation to the movements of the upper-gripping members.

48. In a machine for shaping uppers over lasts, rolls arranged to grip the margin of an upper between them by engagement respectively with the inner and the outer layer of the upper materials, said rolls being rotatable to pull the upper, means for rotating the rolls in sequence to pull the different layers of the upper materials respectively at different times, and devices associated respectively with the different rolls for holding each roll from turning while the other roll is being operated.

49. In a machine for shaping uppers over lasts, rolls arranged to grip the margin of an upper between them by engagement respectively with the inner and the outer layer of the upper materials, said rolls being rotatable to pull the upper, means for rotating the rolls in sequence to pull the different layers of the upper materials respectively at different times, brakes associated respectively with the different rolls for holding each roll from turning while the other roll is being operated, and automatic means for applying each brake upon completion of the rotation of the roll associated therewith.

50. In a machine for shaping uppers over lasts, rolls arranged to grip the margin of an upper between them by engagement respectively with the inner and the outer layer of the upper materials, said rolls being rotatable to pull the upper, a power-driven operating member for rotating said rolls, clutches through which power is transmitted respectively to the different rolls from said operating member, automatic means for actuating said clutches to connect the different rolls respectively to said operating member at different times and to disconnect each roll from the operating member when the other roll is connected thereto, brakes associated respectively with the different rolls and arranged to oppose movement of each roll when the other roll is rotated, and automatic means for applying and releasing said brakes in time relation to the actuation of said clutches.

51. In a machine for shaping uppers over lasts, members arranged to grip the margin of an upper between them, carriers supporting said members and relatively movable to cause the members to grip the upper, and means for moving the members relatively to their carriers to pull the upper heightwise of a last, said members being arranged to pull the upper thereafter inwardly over the bottom of the last in response to relative movement of said carriers and the last and being reversely movable in that operation relatively to their carriers in response to resistance of the upper to the force of the pull applied thereto while maintaining the upper under tension.

52. In a machine for shaping uppers over lasts, members arranged to grip the margin of an upper between them, carriers supporting said members and relatively movable to cause the members to grip the upper, means for moving said members relatively to their carriers to pull the upper heightwise of a last, and means for moving said carriers to carry the members inwardly over the bottom of the last, said members being reversely movable relatively to their carriers in response to pull of the upper thereon while maintaining the upper under tension as they are thus carried inwardly over the bottom of the last.

53. In a machine for shaping uppers over lasts, members arranged to grip the margin of an upper between them, carriers supporting said members and relatively movable to cause the members to grip the upper, means for moving said members relatively to their carriers to pull the upper heightwise of a last, means for moving said carriers to carry the members inwardly over the bottom of the last, said members being reversely movable relatively to their carriers in response to pull of the upper thereon as they are thus carried inwardly over the bottom of the last, and means for opposing with variably predetermined force such reverse movements of the members.

54. In a machine for shaping uppers over lasts, members arranged to grip the margin of an upper between them, carriers supporting said members and relatively movable to cause the members to grip the upper, means for moving said members relatively to their carriers to pull the upper heightwise of a last, means for moving said carriers to carry the members inwardly over the bottom of the last, said members being reversely movable relatively to their carriers in response to pull of the upper thereon as they are thus carried inwardly over the bottom of the last, and brake mechanism for frictionally opposing such reverse movements of the members.

55. In a machine for shaping uppers over lasts, members arranged to grip the margin of an upper between them, carriers supporting said members and relatively movable to cause the members to grip the upper, a power-driven operating member for moving said upper-gripping members relatively to their carriers to pull the upper heightwise of a last, automatic means for connecting the upper-gripping members to said operating member and for disconnecting them therefrom, means for moving said carriers to carry the upper-gripping members inwardly over the bottom of the last, the upper-gripping members being reversely movable relatively to their carriers in response to pull of the upper thereon as they are thus carried inwardly over the bottom of the last, brake mechanism for frictionally opposing such reverse movements of the upper-gripping members, and automatic means for applying said brake mechanism when the upper-gripping members are disconnected from the operating member.

56. In a machine for shaping uppers over lasts, rolls arranged to grip the margin of an upper between them and to pull the upper inwardly over the bottom of a last in response to relative bodily movement of the rolls and the last, said rolls being rotatable in response to resistance of the upper to the force of the pull thus applied thereto.

57. In a machine for shaping uppers over lasts, rolls arranged to grip the margin of an upper between them and to pull the upper inwardly over the bottom of a last in response to relative bodily movement of the rolls and the last, said rolls being rotatable in response to resistance of the upper to the force of the pull thus applied thereto, and means for variably opposing such rotation of the rolls.

58. In a machine for shaping uppers over lasts, rolls arranged to grip the margin of an upper between them and to pull the upper inwardly over the bottom of a last in response to relative bodily movement of the rolls and the last, said rolls being rotatable in response to resistance of the upper to the force of the pull thus applied thereto, and brake mechanism for frictionally opposing such rotation of the rolls.

59. In a machine for shaping uppers over lasts, rolls arranged to grip the margin of an upper between them, said rolls being rotatable to pull the upper heightwise of a last and being arranged also to pull the margin of the upper thereafter inwardly over the bottom of the last in response to relative bodily movement of the rolls and the last, the rolls being reversely rotatable in response to resistance of the upper to the force of the inward pull thus applied thereto.

60. In a machine for shaping uppers over lasts, rolls arranged to grip the margin of an upper between them, said rolls being rotatable to pull the upper heightwise of a last and being also bodily movable inwardly over the bottom of the last, the rolls being reversely rotatable in response to pull of the upper thereon as they are thus moved inwardly over the bottom of the last, and means for opposing such reverse rotation of the rolls to cause them to maintain the upper under tension.

61. In a machine for shaping uppers over lasts, rolls arranged to grip the margin of an upper between them, said rolls being rotatable to pull the upper heightwise of a last and being also bodily movable inwardly over the bottom of the last, the rolls being reversely rotatable in response to pull of the upper thereon as they are thus moved inwardly over the bottom of the last, and brake mechanism for frictionally opposing such reverse rotation of the rolls.

62. In a machine for shaping uppers over lasts, rolls arranged to grip the margin of an upper between them, said rolls being rotatable to pull the upper heightwise of a last and being also bodily movable inwardly over the bottom of the last, the rolls being reversely rotatable in response to pull of the upper thereon as they are thus moved inwardly over the bottom of the last, brake mechanism for frictionally opposing such reverse rotation of the rolls, and automatic means for rendering said brake mechanism effective after the pulling of the upper heightwise of the last.

63. In a machine for shaping uppers over lasts, rolls arranged to grip the margin of an upper between them, carriers supporting said different rolls respectively, means for moving one of said carriers relatively to the other to cause the rolls to grip the upper and for thereafter moving both carriers to carry the rolls inwardly over the bottom of a last on which the upper is mounted, and means for rotating said rolls to pull the upper heightwise of the last before they are moved inwardly over the bottom of the last, the rolls in their inward movements being reversely rotatable to give up the upper stock while maintaining a pull on the upper.

64. In a machine for shaping uppers over lasts, members arranged to grip the margin of an upper between them by engagement respectively with the inner and the outer layer of the upper materials, means for effecting relative movement of said members and a last to cause the members to pull the upper inwardly over the bottom of the last, and means for variably limiting with respect to each of said members independently of the other the amount of force applied respectively by the different members to the corresponding layers of the upper materials in thus pulling the upper.

65. In a machine for shaping uppers over lasts, members arranged to grip the margin of an upper between them by engagement respectively with the inner and the outer layer of the upper materials, means supporting said members, and means for effecting relative movement of said supporting means and a last to cause the members to pull the upper inwardly over the bottom of the last, the members being yieldable each independently of the other relatively to their supporting means in response to resistance of the different layers of the upper materials to the force of the pull thus applied thereto.

66. In a machine for shaping uppers over lasts, members arranged to grip the margin of an upper between them by engagement respectively with the inner and the outer layer of the upper materials, carriers supporting said members and relatively movable to cause the members to grip the upper, means for moving the members relatively to their carriers to pull the upper heightwise of a last, said members being arranged to pull the upper thereafter inwardly over the bottom of the last in response to relative movement of their carriers and the last and being reversely movable in that operation relatively to their carriers in response to resistance of the upper to the force of the pull applied thereto, and means for variably opposing with respect to each of said members independently of the other such reverse movements of the members to determine the force of the pull applied respectively to the different layers of the upper materials.

67. In a machine for shaping uppers over lasts, members arranged to grip the margin of an upper between them by engagement respectively with the inner and the outer layer of the upper materials, carriers supporting said members and relatively movable to cause the members to grip the upper, means for moving the members relatively to their carriers to pull the upper heightwise of a last, said members being arranged to pull the upper thereafter inwardly over the bottom of the last in response to relative movement of their carriers and the last and being reversely movable in that operation relatively to their carriers in response to resistance of the upper to the force of the pull applied thereto, and brakes associated respectively with said different members for frictionally opposing such reverse movements thereof, said brakes being adjustable to vary relatively the forces whereby they control the different respective members.

68. In a machine for shaping uppers over lasts, rolls arranged to grip the margin of an upper between them by engagement respectively with the inner and the outer layer of the upper materials and to pull the upper over a last in response to relative bodily movement of the rolls and the last, said rolls being rotatable in response to resistance of the upper to the force of the pull thus applied thereto, and means for opposing such rotation of the rolls, said means being adjustable to vary relatively the forces whereby the different rolls are thus controlled.

69. In a machine for shaping uppers over lasts, rolls arranged to grip the margin of an upper between them by engagement respectively with the inner and the outer layer of the upper materials and to pull the upper over a last in response to relative bodily movement of the rolls and the last, said rolls being rotatable in response to resistance of the upper to the force of the pull thus applied thereto, and brakes associated respectively with the different rolls for frictionally opposing such rotation of the rolls, each of said brakes being adjustable independently of the other to vary the force with which it controls the corresponding roll.

70. In a machine for shaping uppers over lasts, rolls arranged to grip the margin of an upper between them by engagement respectively with the inner and the outer layer of the upper materials, said rolls being rotatable to pull the upper heightwise of a last and being arranged also to pull the upper thereafter inwardly over the bottom of the last in response to relative bodily movement of the rolls and the last, the rolls being reversely rotatable in response to resistance of the upper to the force of the inward pull thus applied thereto, and means for opposing with respect to each of said rolls independently of the other such reverse rotation of the rolls.

71. In a machine for shaping uppers over lasts, rolls arranged to grip the margin of an upper between them by engagement respectively with the inner and the outer layer of the upper materials, said rolls being rotatable to pull the upper heightwise of a last and being arranged also to pull the upper thereafter inwardly over the bottom of the last in response to relative bodily movement of the rolls and the last, the rolls being reversely rotatable in response to resistance of the upper to the force of the inward pull thus applied thereto, and brakes associated respectively with the different rolls for frictionally opposing such reverse rotation thereof, each of said brakes being adjustable independently of the other to vary the force with which it controls the corresponding roll.

72. In a machine for shaping uppers over lasts, rolls arranged to grip the margin of an upper between them, means for rotating said rolls to pull the upper heightwise of a last, means for thereafter moving said rolls inwardly over an insole on the last, and means arranged to lay the margin of the upper over the insole and to press it upon the insole as the rolls are thus moved inwardly, the rolls in their inward movements being reversely rotatable to give up the upper stock while maintaining a pull on the upper and then to release the margin of the upper.

73. In a machine for shaping uppers over lasts, rolls arranged to grip the margin of an upper between them, carriers supporting said different rolls respectively, means for moving one of said carriers relatively to the other to cause the rolls to grip the upper and for thereafter moving both carriers to carry the rolls inwardly over an insole on a last, and means for rotating said rolls to pull the upper heightwise of the last before they are moved inwardly over the insole, one of said carriers having means for wiping the margin of the upper inwardly over the insole as the rolls are thus moved inwardly, the rolls in their inward movements over the insole being reversely rotatable to give up the upper stock while maintaining a pull on the upper and then to release the margin of the upper.

74. In a machine for shaping uppers over lasts, rolls arranged to grip the margin of an upper between them, means for rotating said rolls to pull the upper heightwise of a last, means for thereafter moving the rolls inwardly over an insole on the last, means movable inwardly with the rolls to lay the margin of the upper over the insole and to press it upon the insole, and means also movable inwardly with said rolls for driving a fastening to fasten the upper to the insole.

75. In a machine for shaping uppers over lasts, rolls arranged to grip the margin of an upper between them, carriers supporting said different rolls respectively, means for moving one of said carriers relatively to the other to cause the rolls to grip the upper and for thereafter moving both carriers to carry the rolls inwardly over an insole on a last, and means for rotating said rolls to pull the upper heightwise of the last before they are moved inwardly over the insole, one of said carriers being provided with means for wiping the margin of the upper inwardly over the insole and also with means for driving a fastening to fasten the upper to the insole.

76. In a machine for progressively lasting shoes by operating on each shoe successively in different locations along the sides thereof, a pair of rolls arranged to grip the margin of the upper between them successively in such different locations along the shoe and rotatable about axes extending lengthwise of the shoe to pull the upper, and power-operated means for rotating the rolls thus to pull the upper and for also laying the margin of the upper inwardly over an insole and fastening it to the insole in each of said locations in a cycle of automatic operations of the machine.

77. In a machine for progressively lasting shoes by operating on each shoe successively in different locations along the sides thereof, a pair of rolls arranged to grip the margin of the upper between them and rotatable about axes extending lengthwise of the shoe to pull the upper, a member for laying the margin of the upper inwardly over an insole, a device for driving a fastening to fasten the upper to the insole, and power-operated means for effecting the gripping and pulling of the upper by said rolls and for also operating said overlaying member and fastening device in a cycle of automatic operations of the machine in each of said locations along the shoe.

78. In a machine for shaping uppers over lasts, upper-shaping means arranged to act on the upper of a shoe in the hands of the operator at a side of the shoe which faces the operator, and a back rest movable into supporting engagement with the other side of the shoe after the shoe has been presented by the operator in position to be operated upon.

79. In a machine for shaping uppers over lasts, upper-shaping means arranged to act on the upper of a shoe in the hands of the operator at a side of the shoe which faces the operator, a back rest movable into supporting engagement with the other side of the shoe after the shoe has been presented by the operator in position to be operated upon, and means for locking said back rest against reverse movement after it has thus assumed a position determined by the shoe.

80. In a power-operated machine for shaping uppers over lasts, upper-shaping means arranged to act on the upper of a shoe in the hands of the operator at a side of the shoe which faces the operator, a back rest for engaging the shoe at the other side thereof, and automatic means for moving said back rest forwardly into engagement with the shoe and for locking it against reverse movement and for thereafter unlocking it and returning it to starting position in the course of a cycle of operations of the machine.

81. In a power-operated machine for progressively lasting shoes by operating on each shoe successively in different locations along the sides thereof in successive cycles of operations of the machine, a device for gripping and pulling the upper of a shoe in the hands of the operator at a side of the shoe which is toward the operator in each cycle of operations, means for laying the margin of the upper at that side of the shoe inwardly over an insole and for fastening it to the insole, a back rest for engaging the shoe at the other side thereof, and means for moving said back rest forwardly into engagement with the shoe in each cycle of operations of the machine.

82. In a power-operated machine for progressively lasting shoes by operating on each shoe successively in different locations along the sides thereof in successive cycles of operations of the machine, a device for gripping and pulling the upper of a shoe in the hands of the operator at a side of the shoe which is toward the operator in each cycle of operations, means for laying the margin of the upper at that side of the shoe inwardly over an insole and for fastening it to the insole, a back rest for engaging the shoe at the other side thereof, means for moving said back rest forwardly into engagement with the shoe and for pressing it yieldingly against the shoe in each cycle of operations, and automatic means for locking said back rest against reverse movement after it has thus engaged the shoe.

83. In a machine for shaping uppers over lasts, upper-gripping means comprising rolls arranged yieldingly to grip the marginal portion of an upper on a last between them, and means arranged to act on the upper between the upper-gripping rolls and the edge of the last bottom to press it against the bottom face of an insole on the last.

84. In a machine for shaping uppers over lasts, rolls arranged to grip the marginal portion of an upper on a last between them and to pull the upper in response to rotation of the rolls only in a direction substantially perpendicular to the bottom of the last, and means associated with said rolls for laying the upper inwardly over an insole on the last.

85. In a machine for shaping uppers over lasts, rolls arranged to grip the marginal portion of an upper on a last between them and rotatable to tension the upper only in a direction substantially perpendicular to the bottom of the last, power-operated means for rotating said rolls, and a wiper for wiping inwardly over an insole on the last portions of the upper tensioned by the rolls.

ROY W. CUMMINGS.

CERTIFICATE OF CORRECTION.

Patent No. 2,337,085.　　　　　　　　　　　　December 21, 1943.

ROY W. CUMMINGS.

It is hereby certified that error appears in the printed specification of the above numbered patent requiring correction as follows: Page 6, second column, line 50, claim 12, before "said" insert --each of--; and that the said Letters Patent should be read with this correction therein that the same may conform to the record of the case in the Patent Office.

Signed and sealed this 28th day of March, A. D. 1944.

Leslie Frazer

(Seal)　　　　　　　　　　　　　　　Acting Commissioner of Patents.